US006760735B1

(12) United States Patent
Rusche (10) Patent No.: US 6,760,735 B1
(45) Date of Patent: Jul. 6, 2004

(54) USER CONFIGURABLE TREE STRUCTURE

(75) Inventor: Christian Andreas Rusche, Wettingen (CH)

(73) Assignee: BSI Business Systems Integration AG, Baden-Dattwill (CH)

(*) Notice: Subject to any disclaimer, the term of this patent is extended or adjusted under 35 U.S.C. 154(b) by 0 days.

(21) Appl. No.: 09/520,700

(22) Filed: Mar. 7, 2000

(30) Foreign Application Priority Data

Mar. 15, 1999 (EP) ............................................ 99200778

(51) Int. Cl.[7] .............................................. G06F 7/00
(52) U.S. Cl. ....................... 707/103; 707/101; 707/102; 707/104; 707/203
(58) Field of Search .............................. 707/1, 3, 100, 707/102, 101, 103, 104, 203; 345/340, 357; 714/1

(56) References Cited

U.S. PATENT DOCUMENTS

| | | | |
|---|---|---|---|
| 5,557,794 A | * 9/1996 | Matsunaga et al. ......... | 707/100 |
| 5,590,265 A | * 12/1996 | Nakazawa ................... | 345/357 |
| 5,644,736 A | 7/1997 | Healy et al. ................. | 345/784 |
| 5,652,884 A | * 7/1997 | Palevich ...................... | 707/102 |
| 5,838,319 A | 11/1998 | Guzak et al. ................ | 345/854 |
| 5,923,328 A | * 7/1999 | Griesmer ..................... | 345/357 |
| 5,953,726 A | * 9/1999 | Carter et al. ................. | 707/103 |
| 5,999,730 A | * 12/1999 | Lewis .......................... | 395/702 |
| 6,028,602 A | * 2/2000 | Weidenfeller et al. ....... | 345/340 |
| 6,141,767 A | * 10/2000 | Hu et al. ........................ | 714/1 |
| 6,177,936 B1 | * 1/2001 | Cragun ........................ | 345/340 |
| 6,321,241 B1 | * 11/2001 | Gartung et al. ............. | 707/503 |
| 6,374,268 B1 | * 4/2002 | Testardi ....................... | 707/205 |
| 6,397,221 B1 | * 5/2002 | Greef et al. ................. | 707/102 |
| 6,453,312 B1 | * 9/2002 | Goiffon et al. ................ | 707/3 |

OTHER PUBLICATIONS

IBM Technical Disclosure Bulletin, "Record Searching on a Per–Column Basis for Presentation Manager Contains in Details View", vol. 38, No. 1, Jan. 1, 1995, pp. 121–123.

IBM Technical Disclosure Bulletin, "Selected Object Filter on Pop–Up Menu", vol. 39, No. 9, Sep. 1, 1996, pp. 157–161.

IBM Technical Disclosure Bulletin, "Graphical Integration of Heterogeneous Computing Systems", vol. 40, No. 1, Jan. 1, 1997, pp. 11–13.

European Search Report for Application No. 99200778.1 dated Oct. 6, 1999.

* cited by examiner

*Primary Examiner*—Thuy N. Pardo
(74) *Attorney, Agent, or Firm*—Merchant & Gould P.C.

(57) ABSTRACT

A configurable user interface arrangement representing data elements of a data source. The user interface arrangement includes a dynamic tree structure monitoring area displaying at least one tree structure having at least one node, each tree having a root node, each node representing a data element or a set of data elements, and each node being user selectable. The user interface arrangement also includes a configuration editor able to establish a configuration code set, the configuration code set defining the structure of the tree structure(s). Each node in the tree structure(s) defines a set of reading commands to be executed when a node is selected in the tree structure monitoring area. The user interface arrangement also has a content monitoring area for monitoring the content or a part of the content of a selected node, the content being established by the set of reading commands. A user may obtain information by selection of a node in a tree structure. Monitoring a data element requires only a simple graphic operation.

11 Claims, 8 Drawing Sheets

USER CONFIGURABLE TREE STRUCTURE

BACKGROUND OF THE INVENTION

The invention relates to a user configurable tree structure interface, generally as follows. A configurable user interface arrangement representing data elements of at least one data source according to the principles of the claimed invention comprises a dynamic tree structure monitoring area (TSMA) displaying at least one tree structure having at least one node (N), each tree having a root node (RN). Each node represents a data element or a set of data elements, and at least one node is user selectable. The configurable user interface also comprises a configuration editor comprising means for establishing a configuration code set, said configuration code set defining the structure of said tree structure(s). At least one node (N) in said tree structure(s) defines a set of reading commands to be executed when a node (N) is selected in the said tree structure monitoring area (TSMA). The configurable user interface also comprises a content monitoring area (CMA) monitoring the content or a part of the content of a selected node, said content being established by said set of reading commands.

Alternatively, a user configurable user interface arrangement representing data elements of a data source according to the principles of the claimed invention comprises a dynamic tree structure monitoring area (TSMA) displaying at least one tree structure having at least one node (N), each tree having a root node (RN). Each node represents a data element (or a set of data elements), and each node is user selectable. The configurable user interface also comprises a content monitoring area (CMA) for monitoring the content or a part of the content of a selected node, said content of data elements being established by said set of reading commands (RC). The configurable user interface also comprises a searching facility operating on established content of the content monitoring area (CMA) of a selected node (N) or non-established content of at least one selected node (N) itself. The said searching facility operates on at least one search criterion or combinations of search criteria, said criteria defining different types of information related to data elements of said content.

The invention also relates to a user interface. A user interface according to the principles of the claimed invention comprises a user interface arrangement as described above, wherein the search is established by an activation of a node (N) as a menu providing a search option on different types of information in the content monitoring area, or combinations of such.

The invention further relates to data processing systems. A data processing system for controlling a user interface of a computer according to the principles of the claimed invention comprises computer processor means for processing data, storage means for storing data in a data carrier, a monitoring unit for monitoring a user-interface, and a configurable user interface as described above.

Alternatively, a data processing system for controlling a user interface of a computer according to the principles of the claimed invention comprises computer processor means for processing data, storage means for storing data in a data carrier, a monitoring unit for monitoring a user-interface, and a configurable user interface as described above.

The invention also relates to a data carrier. A data carrier according to the principles of the claimed invention comprises data establishing a user-interface of a computer as described above.

Conventionally software data management systems are usually specialised to dedicated functions required for the specific application in the sense that use of such kinds of applications requires certain skills not available for personal working primarily with word processors, spreadsheets and simple graphic presentation programs. In particular, this may be the case in industrial computer systems usually including e.g. larger databases containing a very large amount of information being absolutely non-accessible to the above type of basic skill users.

This may e.g. materialise in that an immense amount of data actually present in a computer system is not available for persons having an actual need for accessing this data, as a look-up for this data requires vast knowledge about possible searching and operating features of the specific applications.

This has resulted in certain kinds of report generators being adapted for accessing a certain types of information, which may be printed out. A common feature of these conventional report generators is that they are dedicated for accessing data in intervals of e.g. one week, one day or the like, as the main purpose of such generators are statistics, budget controls or the like. Moreover, they are usually dedicated for use in one specific environment, e.g. a certain type of database.

Another example of systems adapted for providing information to basic skill users are file management systems adapted for managing data of different software applications. A serious disadvantage of such systems is that they provide a 1:1 overview of present data, thus leaving the user alone in a data jungle organised to fit the functional environments and certainly not to be accessed intuitively.

In some systems this problem has been addressed by reorganising the data in such a way that the data are split up or sub-divided in a more intuitively logical way. This reorganising of data is nevertheless costly, and will require very specialised programming and organising of a data source. Moreover, a physical reorganising of data is dangerous, as the risk of faults and breakdowns will exceed.

Moreover, such a reorganisation of data may likely be convenient to some groups of users, but counterproductive to other groups or users.

Another problem related to file management systems is that a user has no possibility to organise data contained in one library appropriate to his needs.

It is an object of the invention to provide a data management system, which may be intuitively accessed by a basic-skill user and which may run with existing system resources.

THE INVENTION

The invention relates to a configurable user interface arrangement representing data elements DE of a data source,
   said user interface arrangement comprising
      a dynamic tree structure monitoring area TSMA,
         said tree structure monitoring area displaying at least one tree structure having at least one node N, each tree having a root node RN
         each of said nodes N representing a data element or a set of data elements
         each node being user selectable,
      a configuration editor CE
         comprising means for establishing a configuration code set,
         said configuration code set defining the structure of said tree structure(s) and for at least one node N in said tree structure(s) defining a set of reading commands to be executed when a node is selected in the said tree structure monitoring area TSMA, and a content monitoring area CMA
monitoring the content or a part of the content of a selected node, said content being established by the said set of reading commands.

According to the invention, an advantageous and compact user friendly arranging of data has been obtained.

According to the invention, a user has the possibility of obtaining a personal adapted tree layout providing the user with the necessary information by means of a simple selection of a node in a tree structure. Thus, a user needs no special or expert knowledge about handling of different types of applications, such as data bases, CAD programs, etc., as a monitoring of a certain data element requires only a simple graphic operation.

It should be noted that, according to the invention, the pre-programming of the reading commands required for establishing the necessary monitoring may be performed by system experts or even only less specialised super users, having the specific knowledge about the certain data type and the possible reading methods.

If the configuration editor is operating in a simple and user friendly way it may be configured by one internal company super user or a number of programmers, each having special knowledge about a certain type of data retrieval.

According to the invention as fast cross access or simultaneous access between different types of applications is established, as the user interface arrangement according to the invention may establish an easy query and listing of all possible data elements in a, computer system, regardless of data types, reading methods, application types, etc.

Moreover it should be noted that the teaching of the invention deals with an intuitive reading and organising of data elements of a data source in a visual an intuitive tree structure. A user is thus no longer restricted to a 1:1 access or reading of data elements known from prior art user interfaces.

The editor of the user interface arrangement may, when appropriately established, ensure that the user interface can be modified dynamically depending upon the wishes and desires of the user.

Consequently, a further feature of the invention is that the created user interface may be established and presented as a personal user interface, which may be booted automatically during boot-up.

Even larger organisations will be able to offer their employees a personal tool without interfering with internal company software policies. The user interface arrangement of the invention will avoid any confusing and modification of the individual standard software applications themselves, but only establishing simple reading procedures cross-referring to the different software applications.

A further aspect of the invention is that the selective reading of each node reduces the amount of data available for a more detailed investigation, as only a little part of the total amount of data is addressed by a selective reading in one node. Thus, according to an embodiment of the invention, an effective sub-organising of data has been obtained, as the reading and investigation of data elements will be restricted to the selected node or sub nodes. Unnecessary searching in data elements irrelevant to the guided user query may thus be avoided.

The selection of a node may e.g, be a simple mouse operation, but many other selection operations are of course possible within the scope of the invention. In other embodiments the node may e.g. be selected by means of a mouse, while a reading of the data elements in the node may be effected separately by means of e.g. different general reading commands, such as a masked reading.

A further aspect of the invention is to regard the user interface according to the invention as a tool optimised and adapted for guided searches in data bases. As the number of data elements in a node of a data typically may be very large, an effective search method or algorithm should be available when a certain desired node has been found and selected. An effective searching and handling of data elements in a node is obtained by means of the visual reducing of data elements, i.e. the visual tree oriented node selection, followed by a listing of a node in the content monitoring area which may be investigated intensely by means of a set of very user friendly searching tools adapted to the content of the node. As the search facilities in each node may be configured specifically to fit to the corresponding data elements.

It should be noted that the reading commands may be supplemented by access commands, if appropriate.

The user interface is preferably adapted for operations on e.g. different data bases, and an addressing of a plurality of data bases are possible.

The editor may be integrated in the user interface or consist of a separated program structure.

Data elements may be files, groupings of files, data elements of a data base, sub-libraries or sub-structures. A data element may e.g. also be an artificially created text picture or other kinds of objects of a node created solely for the purpose of sub-dividing or explaining the information contained in the sub-nodes.

The tree structure may be static or dynamic, but in database environment a dynamic structure will be preferred.

The configuration editor may e.g. a command prompt environment, a visual command construction tool, a common/typical text based editor.

A user selectable node may typically be selected by means of a standard mouse click operation.

When a configurable user interface arrangement wherein the content of the content monitoring area CMA and the layout of the content monitoring area is established by a user in the said configuration editor, a further advantageous embodiment of the invention has been obtained. The configuration editor may thus contain easy accessible commands defining the desired presentation of the data elements in the selected node of the tree.

The determination of the content of CMA in the editor may according to an advantageous embodiment of the invention implement a reading restricted to the desired data elements of the selected node.

When the content of the content monitoring area comprises different information types corresponding to said read data elements, a further advantageous embodiment of the invention has been achieved. Information, such as data, images, etc may be displayed in the CMA, obtaining a predetermined degree of description of each data element.

When the content of the content monitoring area CMA is presented as a list having a number of columns, each column representing a predetermined information type about data elements listed in the content monitoring area CMA, said information being read by said set of reading commands, a further advantageous embodiment of the invention has been obtained, as a listing usually is a very easy accessible organisation of data information.

When said information read by said set of reading commands for at least one column of said content monitoring area is searchable, an advantageous embodiment of the invention has been obtained.

The information read by the reading commands may be searched in a very selectively and user-friendly way, as the search commands are restricted to searches in the selected node and the information read by the reading commands.

When editor comprises a predefined set of commands defining the structure of the tree, for each node N said commands defining
an ID of the node N,
a father ID of a father node,
and optionally said commands defining
a statement defining an executable reading procedure, said executable reading procedure being executed when the said node N is selected,
a visual presentation of the node in the tree structure in the tree structure monitoring area TSMA, said visual presentation comprising a picture and a text,
a menu definition defining an operational feature of the node, said operational feature defining at least one user programming feature, an advantageous embodiment has been achieved.

Moreover, the invention relates to a user interface arrangement representing data elements of a data source, said user interface arrangement comprising
a dynamic tree structure monitoring area TSMA,
said tree structure monitoring area displaying at least one tree structure having at least one node N, each tree having a root node RN
each node representing a data element (or a set of data elements)
each node being user selectable,
a content monitoring area CMA
monitoring the content or a part of the content of a selected node, said content of data elements being established by the said set of reading commands
a searching facility operating on established content of the content monitoring area CMA of a selected node N or non-established content of at least one selected node N itself,
said searching facility operating on at least one search criterion or combinations of search criteria, said criteria defining different types of information related to data elements of said content,
a very preferred embodiment of the invention has been obtained.

Thus, the user interface offers a very attractive compromise of a restricted data set and increased search and masking options. The system may speed up existing file manager systems, and offer the user increased searching options.

This teaching ensures, firstly, that every possible information regarding the data elements contained in the node may be accessed, contrary to state of the art searching facilities, which are dedicated to searching in information contained in every data element of the data source. Secondly, the search restricted to be effected in a single node, may be constrained significantly without slowing the search inconveniently and without occupying system resources.

It should be noted that the above facilities might be incorporated in e.g. file manager systems, thus providing the user a more specific and user intuitive searching and accessing approach, as the searches may be effected in well-defined environments, and in a very truncated amount of data, thus establishing a very fast data access. The reading of the data elements, e.g. data files, when accessing the individual nodes ensures that searches may be made "local" and not through out the whole data source, and the search profile may fit 100% to the present information.

When the data elements are read and presented with associated information of information types, an intuitive read-out has been obtained.

When the data elements comprises files and libraries, an advantageous file manager system has been obtained enabling a fast and user-friendly searching through conventional 1:1 file system representations.

When the information types comprises name, size, type, date and other information associated with a file, and wherein each information type is searchable in each node, an advantageous possibility of searching files of directories or sub-directories represented by a node has been obtained.

When the search is established by an activation of a node (N) as a pop-up menu providing a search option on different types of information in the content monitoring area, or combinations of such, a further advantageous embodiment of the invention has been obtained, as the search may be supported by simple fill-in operations.

Moreover the invention relates to a data processing system for controlling a user interface of a computer, said processing system comprising computer processor means for processing data, storage means for storing data in a data carrier and a monitoring unit for monitoring a user-interface, said system comprising a configurable user interface.

Moreover, the invention relates to a data processing system for controlling a user interface of a computer, said processing system comprising computer processor means for processing data, storage means for storing data in a data carrier and a monitoring unit for monitoring a user interface.

Finally, the invention relates to a data carrier comprising data establishing a user-interface of a computer.

THE DRAWING

The invention will be described below with reference to the drawings in which.

DETAILED DESCRIPTION

Figure 1:
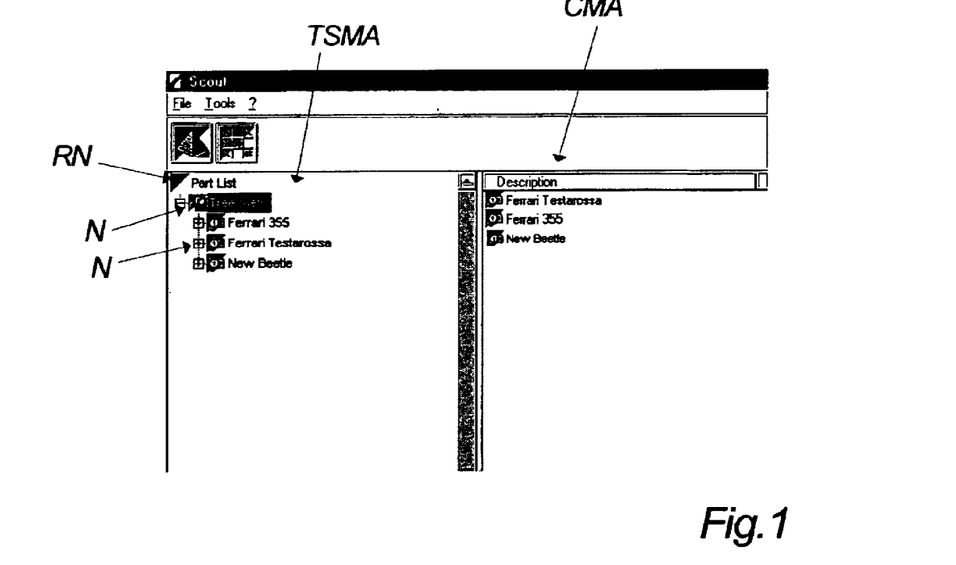
FIG. 1 illustrates basic terms of the invention.

FIG. 1 illustrates some of the principal key features of the invention.

The shown interface is user defined, and established by means of an editor. Some important features of the preferred editor of the invention will be described in FIGS. 5–8.

FIG. 1 shows the user interface of a preferred embodiment of the invention. The key components of the user interface is a tree structured monitoring area TSMA constituting the left side of the shown interface. The right side of the screen interface is a content monitoring area CMA.

The tree structured monitoring area TSMA displays two main types of components of a graphic tree, i.e. a root node RN and a number of sub-nodes N.

The function of the content monitoring area is to monitor the content of a selected node N in the tree structured monitoring area.

In the shown snap shot of the graphical tree structure, a node has been selected, i.e. the high-lighted Tree view node, and consequently, the content of the node has been displayed in the CMA in the Description column. In the shown preferred embodiment, the nodes RN, N may be selected by a mouse or a keyboard.

Figure 2:
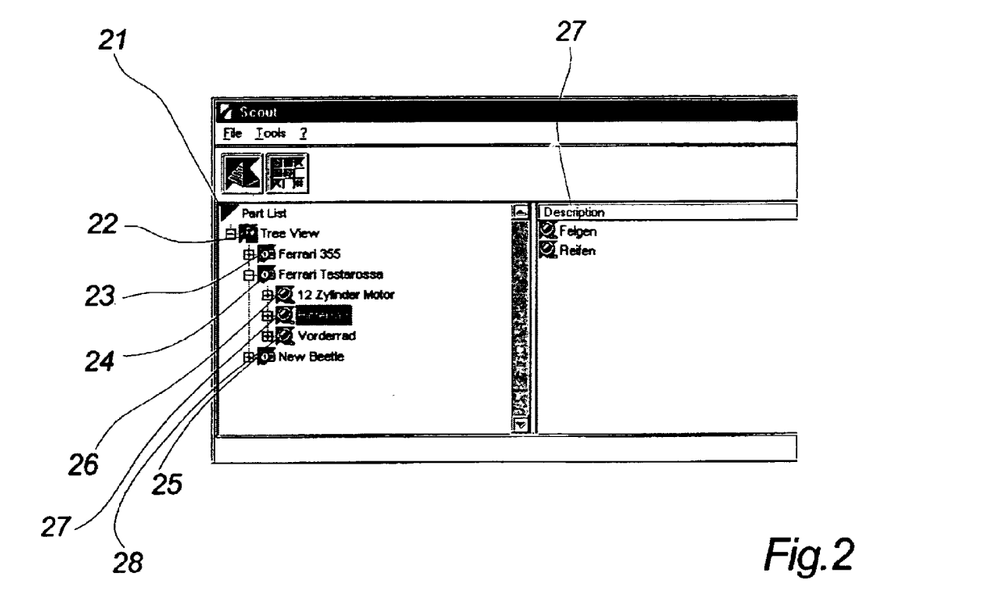
FIG. 2 shows an example of an embodiment of the invention

Turning now to FIG. 2, the TSMA comprises a Part list 21, a sub-node of the Part list 21 named Tree view 22. The Tree view 22 is linked to three shown sub nodes 23, 24 and 26. Moreover the node 24 has been selected and, consequently, three further sub-nodes 25, i.e. the 12 cylinder motor, Hinterrad and Vorderrad are shown.

The content monitoring area CMA displays the content of the selected node 27, shown as the two components Felgen and Reifen. The components are displayed in rows, each row being ordered in a number of user-defined columns 27.

The ordering and the content of the columns is user defined in the sense that the information and headlines is established in the editor.

Figure 3A:
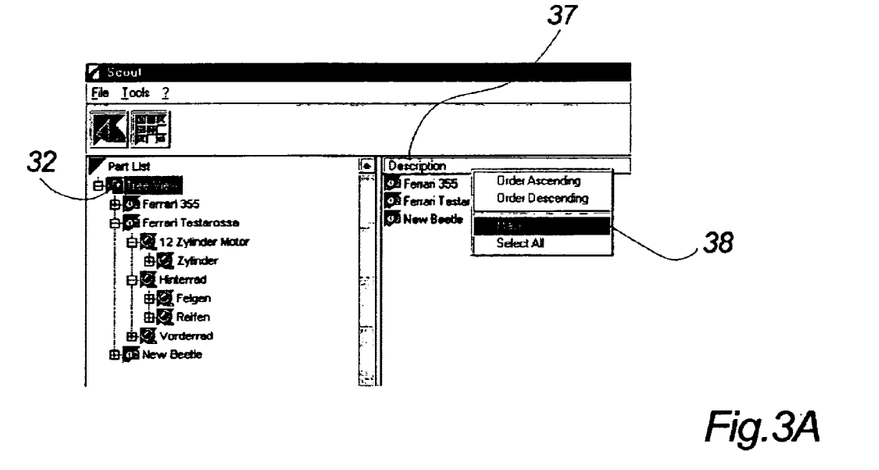
FIGS. 3A and 3B illustrates masking steps performed in the CMA

FIG. 3A shows an example of a preferred embodiment of the invention, in which a pop-up menu 38 activated by a right-clicking of the Description field 37 of the Content monitoring area CMA.

The shown pop-up menu 38 facilitates four operations to be carried specifically on the information contained in the Description 37 column. The selected MASK field results, when activated, in a new Find menu 39 shown in FIG. 3B.

Figure 3B:
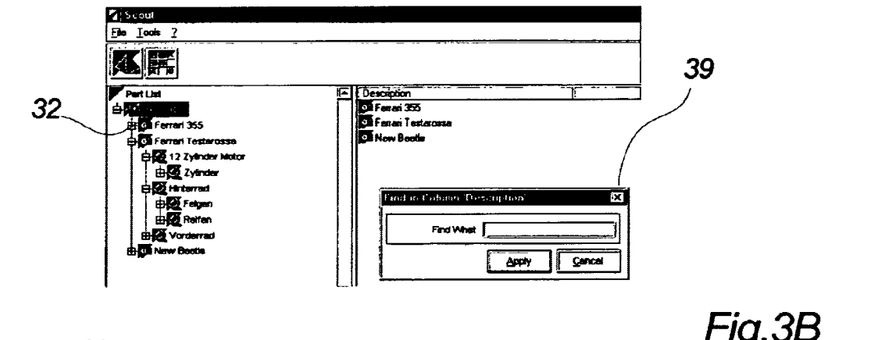

Thus, FIG. 3B provide an input field 39, in which a masking may be introduced on the already read data elements of the activated node, Tree View 32.

A fill in of the word "Ferrari" in the input field 39 would result in a masked content of the description field 37, i.e. the content of the CMA would be reduced to the data elements Ferrari 355 and Ferrari Testarossa.

Figure 4:
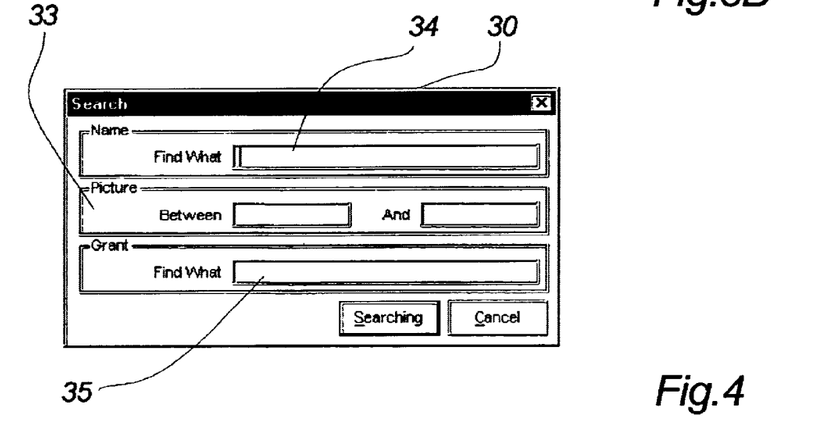
FIG. 4 illustrates a search menu according to the invention

FIG. 4 shows a further, very advantageous feature of the invention. The shown search menu 30 will pop-up when a node in the graphic tree structure is right-clicked. The shown menu refers to a node having data elements having three search options or types, i.e. name, picture and grant which may be applied in a Name field 34, a Picture field 33 and a Grant field 35. It will be appreciated that each search option may search within intervals, as shown in the Picture fields 33.

Each field corresponds to possible data types of each node, and according to the preferred embodiment, every type of information displayed in the columns of the content monitoring area should be searchable.

It should be noted, still according to the preferred embodiment of the invention, that the data elements haven't been read or accessed before the initialisation of the search, thus ensuring that the initialised search may be as fast and simple as possible.

This teaching ensures, firstly, that every possible information regarding the data elements contained in the node may be accessed, contrary to state of the art searching facilities, which are dedicated to searching in information contained in every data element of the data source. Secondly, the search restricted to be effected in a single node, may be constrained significantly without slowing the search inconveniently and without occupying system resources.

It should be noted that the above facilities might be incorporated in e.g. file manager systems, thus providing the user a more specific and user intuitive searching and accessing approach, as the searches may be effected in well-defined environments, and in a very truncated amount of data, thus establishing a very fast data access. The reading of the data elements, e.g. data files, when accessing the individual nodes ensures that searches may be made "local" and not through out the whole data source, and the search profile may fit 100% to the present information.

The establishing of simple searching and facilities in the graphic representations within single sub-nodes is moreover a consequence of a recognition of the fact, that users seldom has support when traversing e.g. file structures.

The masking or searching in a sub-nodes may, according to the invention be effected in any information related or connected to the data element, such as name, type, dates, sizes, etc. and combinations of such.

Figure 5:
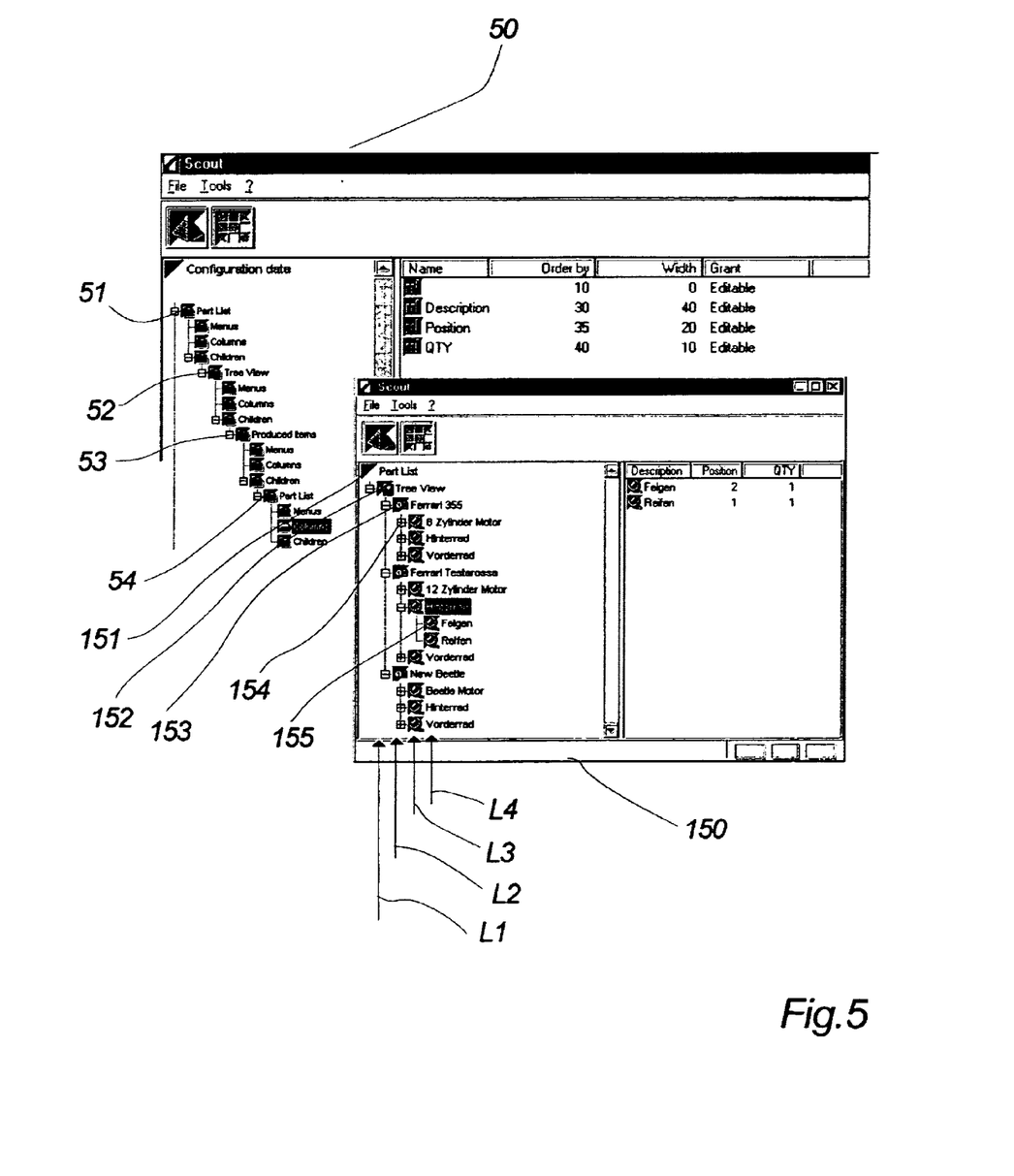
FIG. 5 shows an example of an editor according to the invention.

Turning now to a more detailed description of a tree configuring editor according to the invention, FIG. 5 shows a tree designing editor in which a part list tree is designed.

The tree editor may be implemented in many layouts, as long as both the graphic tree structure area and the content monitoring area may be defined.

The showed view is a configuration editor 50. For the reason of explaining the function of the editor an overlay view 150 of the corresponding created graphic tree structure has been shown.

According to the shown embodiment, the graphic tree may be designed by means of basically three design elements: Menus, Columns and Children.

The Menus defines possible operation functions available for each node of the designed tree structure.

Figure 5A:
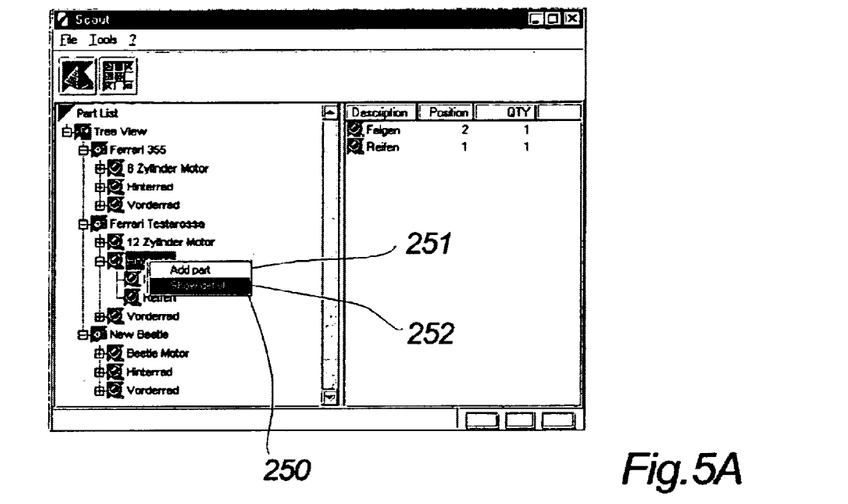
FIGS. 5A, 5B, and 5C shows the establishing of a menu of a node in the TSMA according to the invention.

An example of the establishment of a menu linked to a node is shown in FIG. 5A, in which a menu 250 referring to a node Hinterrad is shown. The shown menu 250 contains two possible options, Add part 251 and Show details 252. The menu options may be established by the system designer, and each node may have a menu of the above explained type, dedicated to operate on that specific node.

Figure 5B:
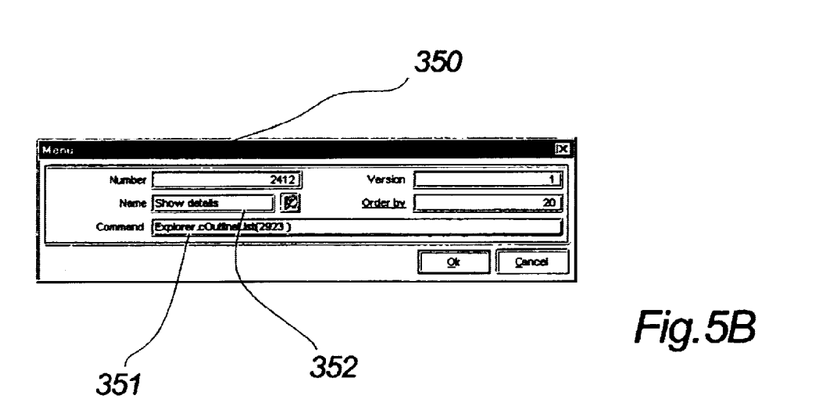

An example of the simple defining of such menu option is shown in FIG. 5B, in which the above described menu option, Show details 252 is defined.

The defining menu 350 comprises information of the name of the menu option, i.e. Show details as shown in a name field 352. Moreover a system command may be linked to the field in the command field 351.

Figure 5C:
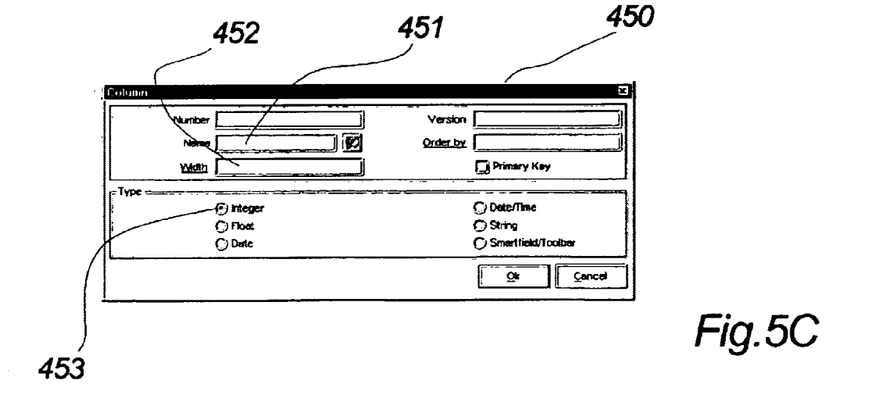

An example of the establishment of the columns of the list view of a node is shown in FIG. 5C, in which a menu 450 contains some main components of definitions of a column.

The column menu 450 comprises a name field 451 in which the name of a column is stated, e.g. QTY, third column of the CMA in FIG. 5A, and a width field 451 stating how broad the name field has to be. Finally the type of the content which has to be established in the CMA is selected in a type field 453.

Every column of a CMA may be established according to the needs of a user and of the available associated information of a data element.

The specific tree structure monitoring area of the view 150 is defined by an editor part list node 51 corresponding to the Part list node 151 of the view 150, a Tree view node 52 corresponding to the Part list node 152 of the view 150.

The Part list node 151 will be mentioned as a level 0 node, and the Tree View node 152 is mentioned as a level one, L1, node of the tree structure area of the view 150. The Ferrari 355 node 153 is a level two, L2, node, the 8 Zylinder Motor 154 is a level three, L3, node and Felgen 155 is a level four, L4, node, each representing a level of the created tree structure.

Level two nodes, e.g. the Ferrari 355 node 153, is established in the node Produced Items 53 and the level three L3 and level four nodes L4 are established in the Part List node 54.

Figure 6:
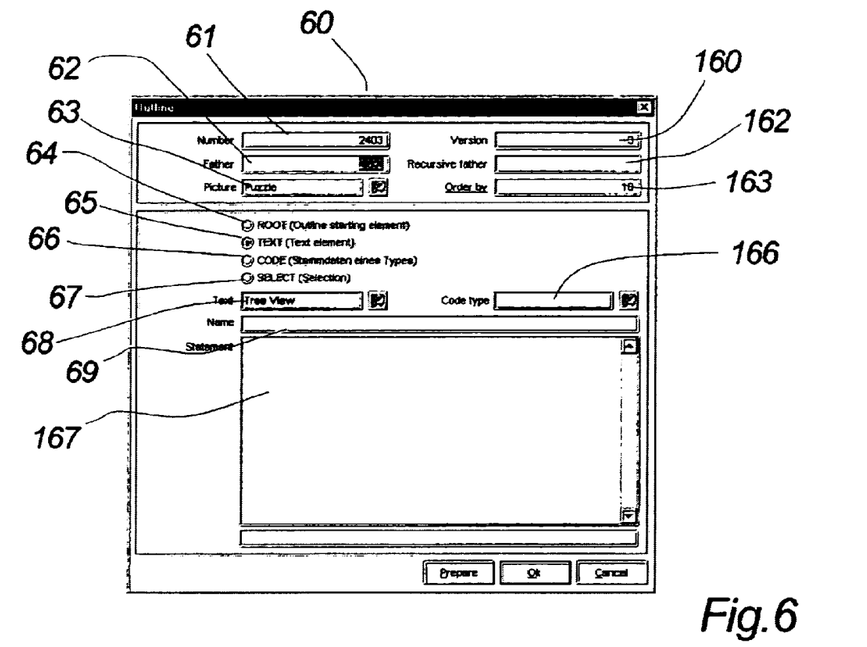
FIGS. 6–8 illustrates the basic components of a node in the TSMA according to the invention.

FIG. 6 shows the defining of a component or more specifically the node 152, Tree View, in a configuration editor menu 60 according to an embodiment of the invention. The shown menu 60 is a very advantageous editor component, as the main necessary definitions may be defined by means of the shown standard menu 60.

The node 152 has been allocated a number in the Number field 61 and a reference node number in the Father field 62. The father number refers to the part list node 151.

The displaying of the defined node 152 or nodes is defined in the Picture field 63 in which several picture fields may be selected. The chosen puzzle icon may be recognised as node 152.

The menu 60 comprises further marking fields 64–68, in which a ROOT field defines a root node, a TEXT field 65 defines a node as being a pure text node, a CODE field 66 defines the data type code 66 and a SELECT field defines a select statement of code to be executed when a node is selected by e.g. a mouse.

The shown node is defined as a text node and the chosen text is "Tree View" which may be recognised in the node 152 next to the icon.

Moreover, the menu contains a name field 69 referring to the name of the Tree View node 52.

If the SELECT field 67 was marked a select statement field 167 is applicable. This field is not activated in this case, as the tree view node 52 contains no select statements. The content and the functionality of the select statement field 167 will be discussed more exhaustive below.

Turning now to the rest of the menu, a Version field 160 is established for the determination of the version of the chosen menu.

Figure 8:
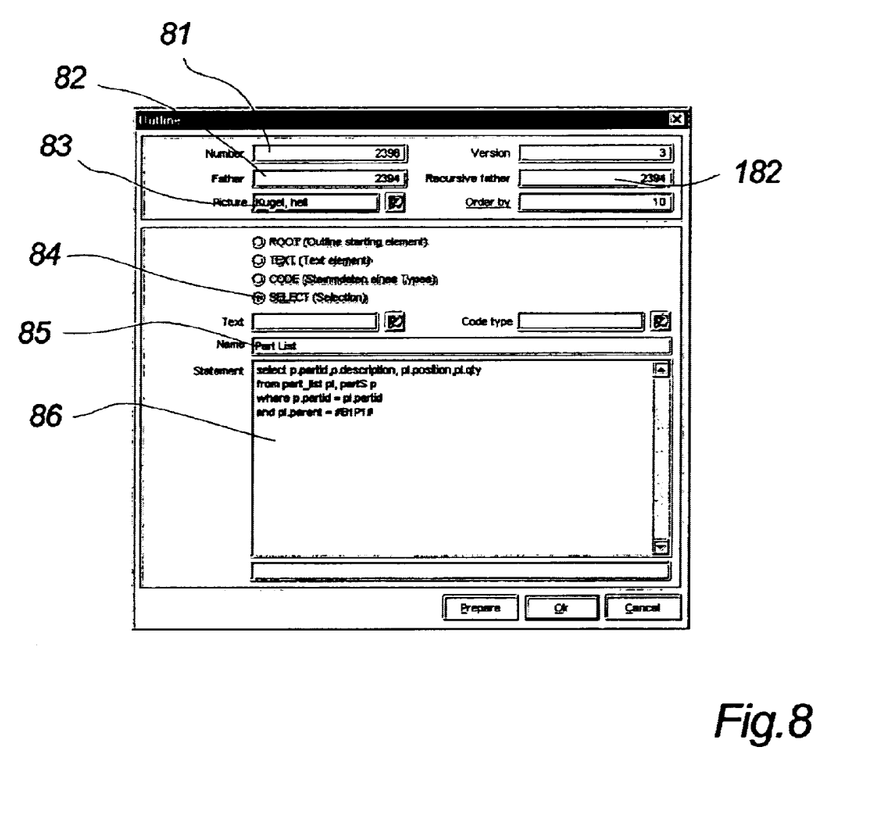

A Recursive father field 162 determines how a current node is related to the father node(s). The field may, if duly filled in, determine a recursive establishment of the node structure. This feature will be exposed in FIG. 8 showing a recursive node.

The menu comprises an Order by field 163 defining the graphical allocation of the node 152 in the established graphical tree.

A very strong feature of the above-described tree is that nodes may be established as pure artificial selectable nodes, without any constrictions of physical data source.

Thus, any desired representation of data sources may be established, such as any subdivision of file systems, data elements, etc. which may be established by means of possible reading commands.

This means, that presentation and searches may be presented to a user more or less independently of where the data elements were acquired. Data may e.g. be represented as incoming orders in given predefined sub-periods independently of the actual "physical" placing of the components. If further explaining sub-nodes is desired for the establishment of a better and more user-friendly accessible tree this may be established by means of minor programming in the editor, and in particular without changing any physical structure, such as establishing of further sub-directories even critical rearranging of the file systems.

Finally the menu contains a code type field 166 linked to the code marking field 66. This field is for the purpose of defining internal defined codes of the editor such as tables establishing languages or the like of the application.

The editor may thus be utilised as an open system in which most of the different kinds of software applications available may be executed. Examples of such applications which may be accessed by means of the invention are data elements of data bases, linked visual representations of the data elements, CAD files, predefined masked reports of data bases, etc.

According to the shown embodiment, the select statement editor will solely contain SQL statements.

According to a further embodiment of the invention, several data sources may be accessed at the same time when one node is activated, and the retrieved information about data elements may be presented in the CMA, Content Monitoring Area simultaneously. This possible simultaneous mode of operation decreases the searching time significantly and consequently the load on the system resources will be decreased.

Any user may thus be able to access any system and any information independently of skills, as the access is purely intuitively based, and the necessary skills required for accessing certain desired information are embedded in the system.

A further advantage of the above described detail is that the coding of the select statements may be done by different programmers. Consequently, experiences of different superusers may be exploited.

Figure 7:
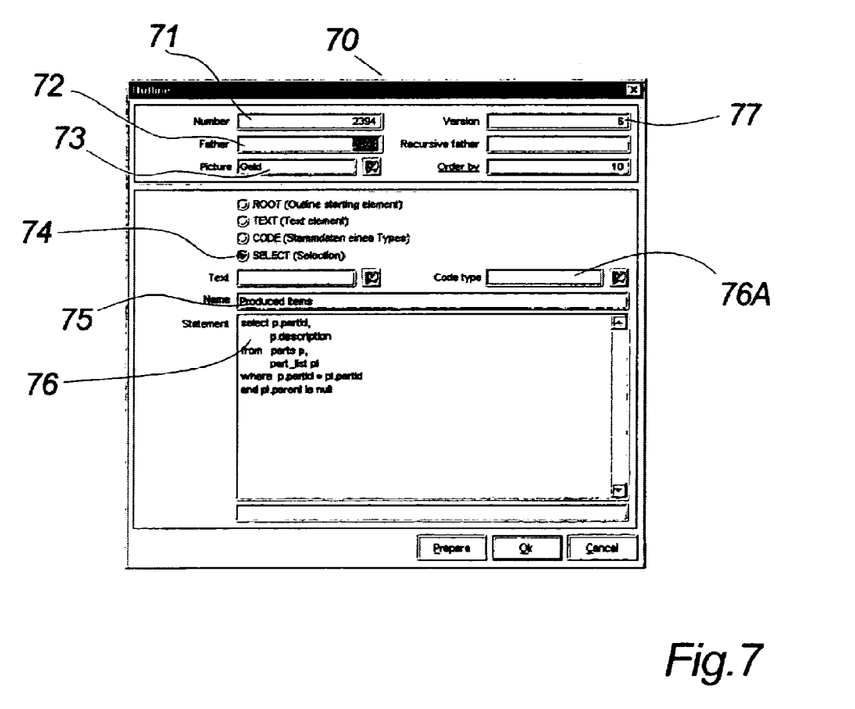

FIG. 7 shows a further example of the content of a node menu 70. The node menu 70 refers to the level two 153 shown in FIG. 5.

Referring to the menu field 72, the nodes level two nodes 153 are defined as sub-nodes of the above described tree node 152, Tree View, and the Picture field 73 defines the level two node icons, as displayed in FIG. 5.

The shown marking of the Select field 74 indicates that the menu item has been dedicated to contain a SQL select statement to be activated and executed when the node 152 is activated.

In the name field 75 the naming of the established group of children are labelled Produced items, i.e. the node 53 of FIG. 5.

The code filled in the statement field 76 is a set of SQL statements calling a database containing the necessary data. The established data set is the children of the Tree View node 152, i.e. the level two nodes 153. The SQL reading statements read and return the addressed data, i.e. p,partid= Ferrari 355, Ferrari Testarossa and New Beetle as shown in the TSMA in FIG. 2.

FIG. 8 shows a further example of the content of a node menu 80. The node menu 80 refers to the level three 154, shown in FIG. 5, i.e. the nodes 12 cylinder motor, Hinterrad, Vorderrad. Moreover, due to a recursive construction of the sub nodes the menu further refers to established sub nodes of the level three nodes 155, i.e. the nodes Felgen and Reifen. This recursive establishment of nodes will be described in detail below.

Referring to the menu field 82, the nodes level three nodes 154 are defined as sub-nodes of the above described level two nodes 153, and the Picture field 83 defines the node icons, as displayed in FIG. 5.

The shown marking of the Select field 84 indicates that the menu item has been dedicated to contain a SQL select statement to be activated and executed when one of the level three nodes is activated.

In the name field 85 the naming of the established group of children is labelled Part List, i.e. corresponding to the Part list node 54 of the editor of FIG. 5.

The code filled in the statement field 86 is a set of SQL statements calling a database containing the necessary data. The established data set is the children of the nodes level three nodes 154. The SQL reading statements read and return the addressed data values, i.e. the description: 8 Zylinder Motor, 12 Zylinder Motor or Beetle Motor as shown in FIG. 5, position and quantity as display in the CMA.

Moreover, the menu defines sub-node information recursively by the Recursive defining field 182, for which the same select statements will be executed when selected. In other words, an activation of one of the level three nodes 154 of FIG. 5 will result in an activation of the same select statements, i.e. the statements in the field 86, which provided the information of the level three nodes 154.

This recursive building of the reading statements is very attractive to the programmer of the graphic tree structure and the corresponding content monitoring area if data are represented in the tree monitoring area with the same parameters, i.e. in this example Description, Position and QTY, quantity.

Figure 9:
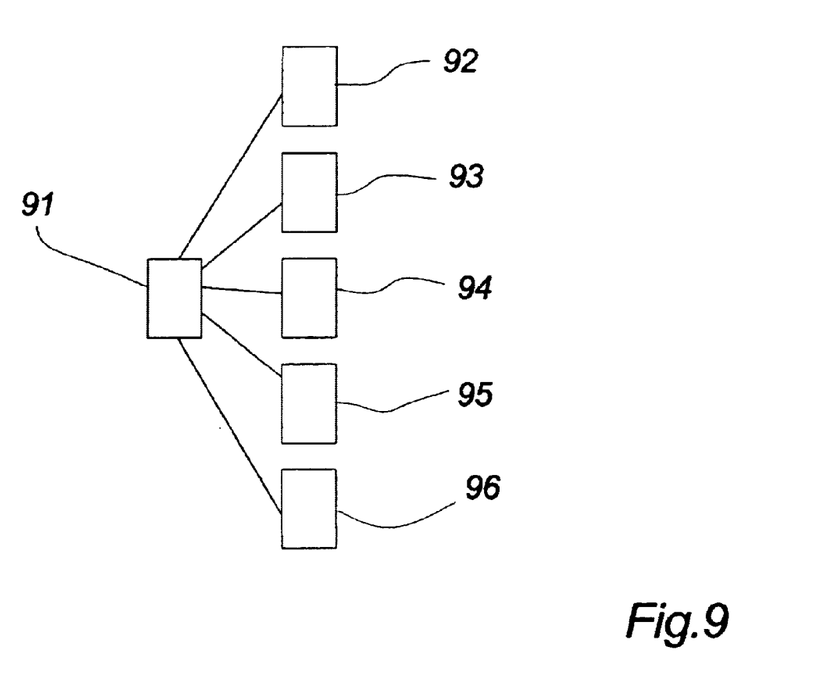
FIG. 9 is a principle illustration of the user interface.

FIG. 9 shows an illustration of the possible intuitive approach of the invention, in which nodes 91–95 represents data segments, or more specifically icons, ordered in a logic way to the user or users. The user is not immediately aware of any mismatch between the types of the data elements, and even less with the establishment of more or less complicated searching and accessing criteria.

Figure 10:
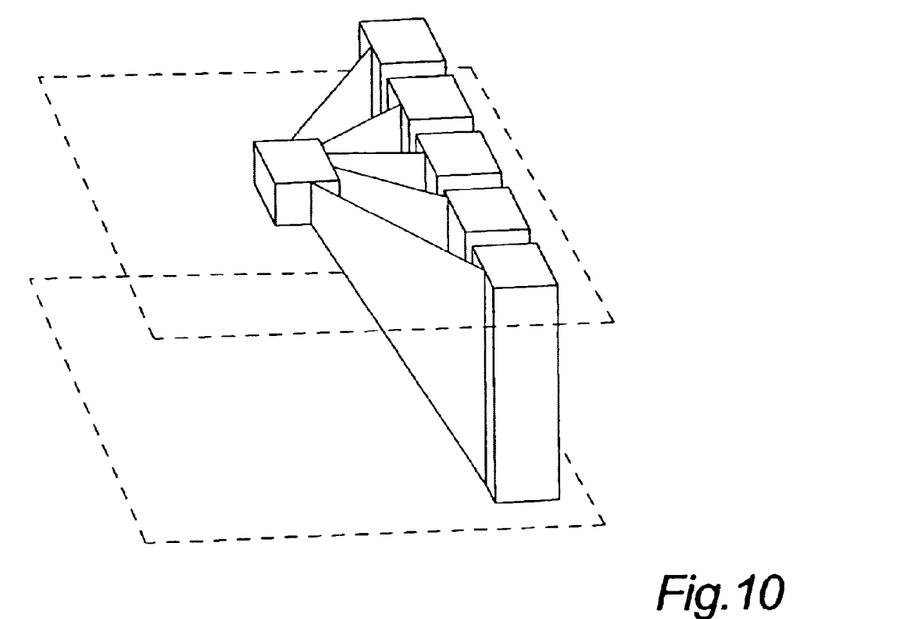
FIG. 10 illustrates an intuitive understanding of the invention.

FIG. 10 illustrates the underlying information and programming established as e.g. select statements.

The select statements may be SQL statements calling several different data bases unknown to the user, and simultaneously displaying data elements of information contained in the data elements.

In other words, FIG. 9 illustrates what the user sees, and FIG. 10 illustrates what the user gets.

Moreover, the invention provides an intuitive data management system which may be causing no modification of the data base to be operated.

Figure 11:
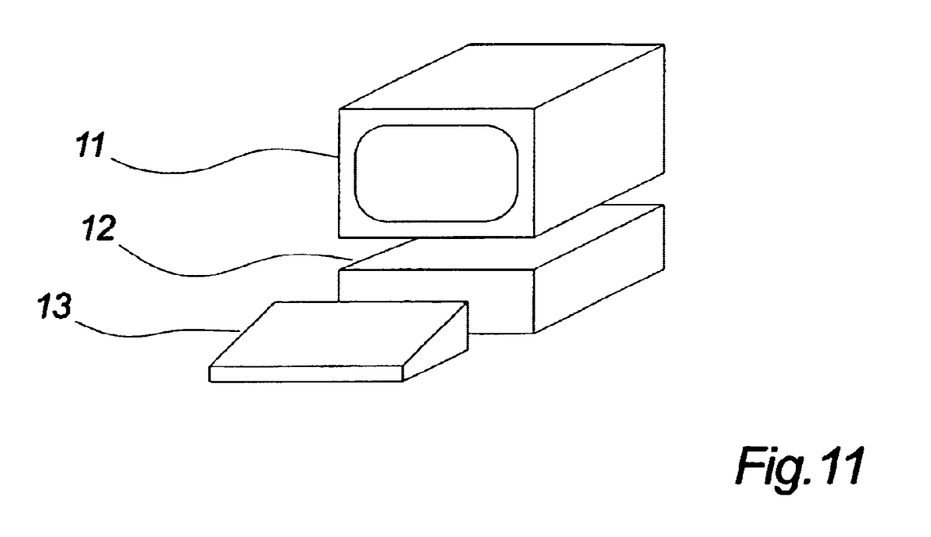
FIG. 11 shows the main hardware facilities of a computer

FIG. 11 shows a personal computer 12 including a CPU (not shown), the said computer 12 comprising a data disk and an arithmetic logic circuit configured to prepare the data disk to magnetically store selected data (not shown).

The computer moreover comprises a monitoring unit 11, and an activation or selecting means in the form of a keyboard 13.

What is claimed is:

1. A configurable user interface arrangement representing data elements of at least one data source,
    said user interface arrangement comprising
        a dynamic tree structure monitoring area, said tree structure monitoring area displaying at least one tree structure comprising at least one node, each tree comprising a root node
        each node representing a data element or a set of data elements
        at least one node being user selectable,
        a configuration editor adapted to edit said at least one tree structure
            comprising means for establishing and editing a configuration code set,
            said configuration code set defining the structure of said at least one tree structure, and
            for at least one node in said at least one tree defining a set of reading commands to be executed when a node is selected in said tree structure monitoring area, and
        a content monitoring area
            monitoring at least a part of a content of a selected node, said content being established by said set of reading commands.

2. A configurable user interface arrangement according to claim 1, wherein the content of the content monitoring area and the layout of the content monitoring area are established by a user in said configuration editor.

3. A configurable user interface arrangement according to claim 1, wherein the content of the content monitoring area comprises different information types associated with said read data element.

4. A configurable user interface arrangement according to claim 1, wherein the content of the content monitoring area is presented as a list comprising a number of columns, each column representing a predetermined information type about data elements listed in the content monitoring area, said information being read by said set of reading commands.

5. A configurable user interface arrangement according to claim 1, wherein said information read by said set of reading commands for at least one column of said content monitoring area is searchable.

6. A configurable user interface arrangement according to claim 1, wherein the editor comprises a predefined set of commands defining the structure of the tree, for each node said commands defining
    an ID of the node, and
    a father ID of a father node.

7. A configurable user interface arrangement according to claim 6, wherein
    said commands define a statement defining an executable reading procedure, said executable reading procedure being executed when said node is selected.

8. A configurable user interface arrangement according to claim 6, wherein
    said commands define a visual presentation of the node in the tree structure in the tree structure monitoring area, said visual presentation comprising a picture and a text.

9. A configurable user interface arrangement according to claim 6, wherein
    said commands define a menu definition defining an operational feature of the node, said operational feature defining at least one user programming feature.

10. Data processing system for controlling a user interface of a computer, said processing system comprising computer processor means for processing data, storage means for storing data in a data carrier and a monitoring unit for monitoring a user-interface, said system comprising a
    configurable user interface arrangement representing data elements of at least one data source,
    said user interface arrangement comprising
        a dynamic tree structure monitoring area, said tree structure monitoring area displaying at least one tree structure comprising at least one node, each tree comprising a root node each node representing a data element or a set of data elements at least one node being user selectable, a configuration editor adapted to edit said at least one tree structure comprising means for establishing and editing a configuration code set, said configuration code set defining the structure of said at least one tree structure and for at least one node in said at least one tree defining a set of reading commands to be executed when a node is selected in said tree structure monitoring area, and a content monitoring area monitoring at least a part of a content of a selected node, said content being established by said set of reading commands.

11. Data carrier comprising data establishing a configurable user interface arrangement of a computer, said user interface arrangement comprising a dynamic tree structure monitoring area, said tree structure monitoring area displaying at least one tree structure comprising at least one node, each tree comprising a root node each node representing a data element or a set of data elements at least one node being user selectable, a configuration editor adapted to edit said at least one tree structure comprising means for establishing and editing a configuration code set, said configuration code set defining the structure of said at least one tree structure and for at least one node in said at least one tree defining a set of reading commands to be executed when a node is selected in said tree structure monitoring area, and a content monitoring area monitoring at least a part of a content of a selected node, said content being established by said set of reading commands.

\* \* \* \* \*